March 5, 1963 H. ORNER 3,080,159

SPRING MECHANISM

Filed May 9, 1960

INVENTOR

*Harry Orner* ited States Patent Office 3,080,159
Patented Mar. 5, 1963

3,080,159
SPRING MECHANISM
Harry Orner, 2479 Glen Canyon Road, Altadena, Calif.
Filed May 9, 1960, Ser. No. 27,591
8 Claims. (Cl. 267—1)

This invention relates to a spring mechanism, and more particularly to a new and improved device of this type operable to convert a force into radial displacement of a resilient annular element.

This invention is a continuation-in-part of my copending application, Serial Number 684,310; filed September 16, 1957, for Spring Mechanism, now abandoned. Reference is also made to the copending applications, Serial Number 78,055, filed December 23, 1960, and Serial Number 188,112, filed April 17, 1962, both for Spring Mechanism.

Spring mechanism are required in a great variety of applications having need to absorb and release energy. A spring may be defined as an elastic body whose primary function is to deflect or distort under load and which recovers to its original shape when released after being distorted. Such springs come in various forms using various means of stressing resilient material. All springs have the primary consideration of load and deflection which is the mathematical function of the energy stored therein.

An ideal spring would consist of a simple straight bar of uniform section subject to an axial load at its end. Since the bar is loaded axially the stress distribution across the section is uniform and for this reason it represents the optimum condition from the stand point of maximum energy storage per unit volume of material. The tension yield point would be considered the limiting stress and the deflection would vary directly with the length of the bar. If the bar is subject to fatigue or repeated loading the stress at the endurance limit would be limited by the stress concentration present near the end of the bar where it would be clamped or changed in section. This would reduce the ideal maximum load and deflection for practical use. Such springs are thus subjected to this and other disadvantages outstanding among which are the limited deflection to the length of the bar. Springs of other forms use means for increased deflection at a large sacrifice of the maximum allowable load.

The present invention provides a spring mechanism obviating the foregoing major disadvantages and others as will be apparent by the following disclosure. In lieu of the bar in any of the forms of former designs, this invention employs an annular spring element having no ends to clamp and uses the displacement in circumferential stress of this spring element to get a variety of designed deflection relationships at high values of load.

It is the primary object of this invention to provide an improved spring mechanism of relative high value of energy capacities with a wide range of load-deflection relationship.

Another object of this invention is to provide a spring mechanism utilizing substantially all the spring material in tensile stress.

Another object of this invention is to provide a spring mechanism wherein the spring element is annular in shape and is displaced radially.

Another object of this invention is to provide a high load spring member that can be mounted concentrically with a shaft.

Another object of this invention is to provide a spring mechanism using a spring element consisting of an annular member made by circumferentially winding glass fiber and impregnating these fibers with a plastic material.

Another object of this invention is to provide a spring mechanism adaptable to provide low hysteresis losses.

Another object of this invention is to provide a spring mechanism adaptable to provide a medium to absorb shock loads.

Another object of this invention is to provide an article of manufacture of simple construction for economical fabrication.

Other objects of this invention will become fully apparent as reference is had to the accompanying drawings wherein my invention is illustrated and which:

Figure 1:
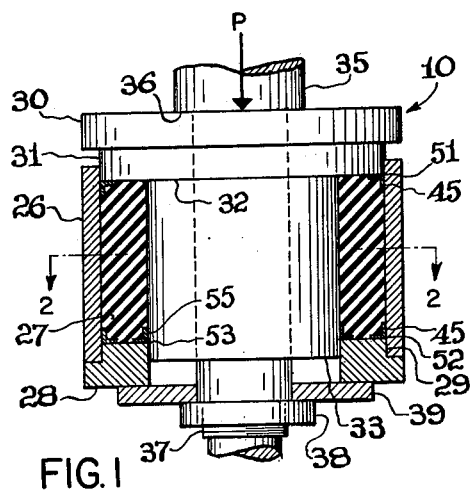
FIGURE 1 illustrates a form of my invention, which is a sectional view taken on plane 1—1 of FIGURE 2.
Figure 2:
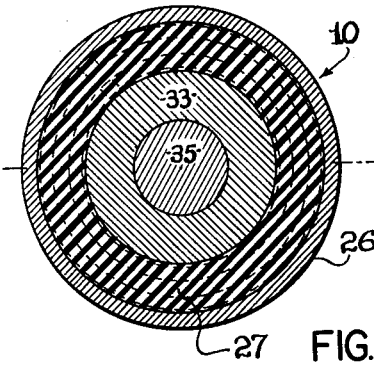
FIGURE 2 is a sectional view taken on plane 2—2 of FIGURE 1.

The spring mechanism 10 shown in FIGURES 1 and 2, consist of a spring element in the form of cylinder 26, taking the elastic tensile stress and can be made of any springy material that has a maximum optimum value of yield point and elasticity. The cross-sectional wall area of the cylinder 26 should be uniform along its entire circumference for maximum elongation.

Materials such as heat treated spring steel, aluminum, or any metal could be used, but a less rigid material may be more ideal suited. Reinforced glass fiber may be used to great advantage because of its unique combination of high elastic stress limit and tensile strength. In the cylinder 26, glass fiber would be wound around a mandrel in a circular direction for maximum hoop tensile strength. From the tests on pressure vessels it was found that glass-reinforced plastics actually represent a spring material of unique properties for the following reasons: Glass filaments have a modulus of elasticity in tension of about 10,000,000 p.s.i. and an elastic elongation from 3% to 4%, resulting in an elastic limit from 300,000 to 400,000 p.s.i.

Such unidirectional glass fiber structures were found to have a moduli of elasticity in the range from 3,000,000 to 6,000,000 p.s.i., depending on the pattern of winding and glass density. The elastic limit of strain is upward of 3%, or .030 inch per inch, and tensile strengths up to 200,000 p.s.i. have been measured in the direction of the fibers.

Captivated within the circumference of cylinder 26 is an elastomeric material 27, such as a rubber compound or any displaceable material, and retained at the lower end by a radial wall formed by a ring 28, having an annular reduced diameter 29 that fits into the inside diameter of cylinder 26. On the upper end of cylinder 26 an end cover 30 is provided with a reduced diameter 31 that fits into the inside diameter of cylinder 26, with an end wall 32 contacting the elastomeric material 27. A sleeve portion 33 integral with the end cover 30 concentrically mounted with cylinder 26 extends along the entire inside diameter of the elastomeric material 27 and partly into the inside diameter of ring 28.

A shaft 35 concentric with cylinder 26, extends through the inside diameter of sleeve 33 with a shoulder 36 abutting the top of cover 30, and the other end extends below the ring 28 with a reduced diameter 37 threaded to receive a nut member 38 abutting on a shim washer 39, retaining ring 28 and end cover 30 in assembly.

Thus the elastomeric material 27 is completely captivated on all surfaces. The end cover 30 is thus moveable axially with end wall 32 and sleeve 33 to compress the elastomeric material 27. This elastomeric material in this illustrated embodiment is preferably made of rubber compound which is substantially incompressible, and the volume remains practically constant regardless of the distortion. Natural rubber compounds are superior to synthetic rubber in elasticity and they show the lowest energy loss due to hysteresis, and the lowest rate of heat build-up under rapid deformation. Next to natural rubber comes neoprene rubber compound, while buna types are the lowest in elasticity and highest in hysteresis loss. Synthetic rubber compounds generally show a greater absorption of energy during repeated stresses, and this quality is desirable where rapid damping of vibration is important.

The axial movement of the wall 32 on the end radial surface of the elastomeric material 27 displaces a volume of this material equivalent to the area of the end wall 32 times the distance of its movement into cylinder 26. This displaced volume acting like a fluid to exert a pressure in all directions by the elastomeric material 27 on the entire closed vessel consisting of the inside diameter of the cylinder 26, end wall of the ring 28, end wall surface 32, and the outside diameter of the sleeve 33. In this illustrated embodiment the wall of the cylinder 26 is made of a predetermined cross-sectional area so as to expand in diameter under pressure. The other wall members being made relatively rigid. This cylinder circumference will be increased by a volume displacement substantially equivalent to the displaced volume by the end wall 32.

The force P required to expand the cylinder 26 is a factor of the cross-sectional area along its axis, and the modulus of elasticity of the material. This cross-sectional area can be considered in tension and the stress distribution on the circumference is substantially uniform and for this reason it approaches the optimum condition for maximum energy storage. The tension yield point can be considered the limiting stress and the deformation would vary directly with the circumference of the cylinder 26. Since the cylinder is continuous and uniform on the entire circumference there is no area of stress concentration to reduce the maximum load and deflection when subject to fatigue or repeated loading.

Thus by applying a force P on the end of cover 30 the elastomeric material 27 is compressed to displace the cylinder 26 radially. When this force P is removed from end cover 30 the cylinder 26 contracts by its stored elastic force to transmit this force by means of the volumetric displacement of the elastomeric material 27 to the end wall 32 to force the end cover 30 to move back to its original position. Spring mechanism 10 could be used in any equipment where a high force P is required relative to a comparative small deflection.

Figure 3:
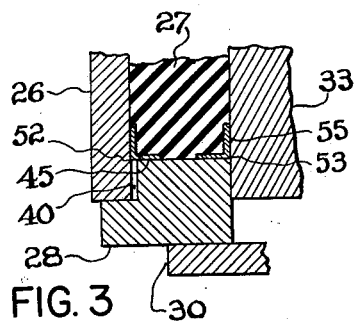
FIGURE 3 is an enlarged fragmentary view of FIGURE 1.
Figure 4:
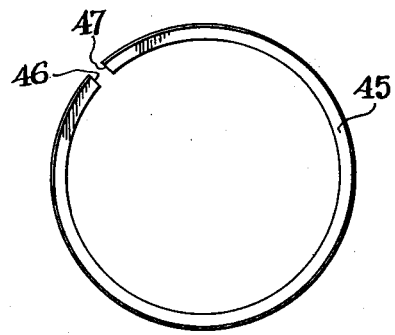
FIGURE 4 is a plan detail view of an element in FIGURES 1 and 3.
Figure 5:
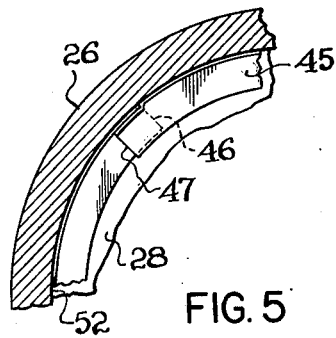
FIGURE 5 is an enlarged fragmentary view of FIGURE 2, with a portion removed.

In the spring mechanism 10, the cylinder 26 expands under the load P and moves radially outward leaving a space 40, see FIGURE 3, at the upper end 51 and lower end 52, which may become large enough to permit the extruding of the elastomeric material. To prevent such leakage an annular flanged ring 45, see FIGURE 4, is provided split to form the ends 46 and 47, to be assembled at the respective corners 51 and 52. The ring 45 is assembled at these locations preferable with ends 46 and 47 overlapping as illustrated in FIGURE 5, and to resiliently bear on the inside diameter of the cylinder 26, at 51 and 52. At 53 a similar ring 55 may be provided to permit a more liberal fit of sleeve 33 into ring 28. The ring 55 would have the flange reversed since it fits over the sleeve 33.

These rings 45 and 55 can be made of most any material that is more rigid than the elastomeric material 27, or any of the other materials substituted for the elastomeric material. These rings can be made of brass, aluminum, or any of the better wearing plastics.

The above explained spring mechanism 10 can be designed to be used for such equipment as die springs for punch presses, heavy machinery mounting, hold down clamping of a high force, or any requirement of small resiliency under high load in a limited space, and at an economical consideration. This mechanism is further adaptable to be mounted on a shaft member such as shaft 35, which is the preferred mounting of most spring applications of this nature.

Thus is provided a spring mechanism 10, that can be mounted on a shaft member and stressed by an axial force to displace an annular element, of resilient material such as reinforced fibre glass structure, in hoop stress to store energy at a large value.

While this particular spring mechanism disclosed in detail is fully capable of attaining and providing the advantages therebefore stated, it is to be understood that this is merely illustrative of the present preferred embodiment of the invention and that no limitations are intended to the details of construction or design herein shown other than as defined in the appended claims.

What is claimed is:

1. In a spring mechanism, a cylinder wall of uniform thickness and axial length on its entire circumference, rigid end walls on the opposite open ends of said cylinder wall and unattached to said cylinder wall, a rigid sleeve extending concentrically therein, an elastomeric material confined therein and contacting the interior of said cylinder wall, both rigid end walls, and the exterior of said rigid sleeve, one of said end walls disposed to be moved by a force into said cylinder wall to displace a volume of said elastomeric material, said cylindrical wall expansible elastically in circumference by substantially an equivalent volume, said force being relatively proportional to the stress in the uniform cylinder wall section.

2. In a spring mechanism, a resilient ring of uniform thickness, an axially located shaft member in said ring, a shoulder on said shaft member, or relatively movable annular member on said shaft member forming a second shoulder, a deformable member within said ring extending from said shaft member to the inner circumferential wall of said ring and to said shoulders, retaining means between said shoulders to maintain said ring and said deformable member in an unitary assembly with said shaft member, to thereby transmit the axial movement of said shaft member to deform said deformable member to strain said resilient ring in hoop stress.

3. In a spring mechanism, a shaft member, a resilient ring of uniform axial section mounted concentrically with said shaft member, a shoulder associated with said shaft member, displaceable means located between said shoulder of said shaft member and said resilient ring to transmit relative axial movement into radial displacement of said resilient ring to thereby stress said resilient ring elastically in hoop stress, said displaceable means retained opposite to said shoulder of said shaft member by an abutment, said shaft member extending through said abutment and retained thereto by an annular member on the opposite end of said shaft member, means on said abutment to retain said resilient ring concentric relative to said shaft member.

4. In a spring mechanism, a resilient cylinder of uniform section comprising a fiber wound circular in a reinforced material, a shaft extending axially through the center of said resilient cylinder, structural means extending radially between said shaft and said resilient ring, an annular surface on said shaft, displaceable means extending between said annular surface of said shaft and said resilient cylinder and said structural means to transmit relative axial movement of said structural means into radial displacement of said resilient cylinder, said displaceable means retained opposite to said annular surface on said shaft by said structural means, said shaft extending through said structural means and retained by an annular member on said shaft.

5. In a spring mechanism, a resilient cylinder of uniform section and open at its ends, unattached radial end walls at the ends of said cylinder, a displaceable material completely contacting said cylinder within said end walls, a shaft member, a sleeve member associated with one of said walls and fitted on said shaft member in contact with said displaceable material, an annular end area on one of said end walls in contact with said displaceable material and disposed to be moved into said cylinder to thereby displace said material therein and transmit the pressure of displacement on the interior surface of said cylinder, to thereby strain said cylinder along its entire circumference.

6. The invention as claimed in claim 5, wherein said resilient cylinder is formed of fiber wound circular and retained in reinforced material.

7. The invention as claimed in claim 5, including sealing means at the corner areas of the end walls and said resilient cylinder to prevent extrusion of said displaceable material therebetween.

8. In a spring mechanism, a resilient ring, a shaft concentric with said resilient ring and relative axial movement therebetween, transfer means contacting said shaft and said ring within said resilient ring to transfer the relative axial movement of said shaft into radial displacement of said resilient ring to thereby stress said resilient ring elastically in hoop stress, and said transfer means to transfer the hoop stress in said resilient ring back into the relative axial movement of said shaft, wherein said transfer means forms a part of a closed vessel, said resilient ring being movably mounted as the outer wall, said transfer means including unattached end walls on said resilient ring, and a sleeve associated with one of said end walls forming an inner circumferential wall, a displaceable material in said vessel contacting said inner wall and said resilient ring between said end walls, wherein one of said walls acting on said displaceable material by the relative axial movement of said shaft and to the other of said end wall to transfer said axial force into displacement of said displaceable material.

References Cited in the file of this patent

UNITED STATES PATENTS

| | | |
|---|---|---|
| 2,485,009 | Muller | Oct. 18, 1949 |
| 2,708,110 | Clay | May 10, 1955 |
| 2,846,211 | Taylor | Aug. 5, 1958 |
| 2,879,986 | Maier | Mar. 31, 1959 |

FOREIGN PATENTS

| | | |
|---|---|---|
| 315,941 | Great Britain | July 25, 1929 |
| 500,476 | Germany | June 21, 1930 |
| 835,539 | Germany | Apr. 3, 1952 |
| 884,677 | France | May 3, 1943 |

UNITED STATES PATENT OFFICE
CERTIFICATE OF CORRECTION

Patent No. 3,080,159                                                 March 5, 1963

Harry Orner

It is hereby certified that error appears in the above numbered patent requiring correction and that the said Letters Patent should read as corrected below.

Column 4, line 32, for "or" read -- a --.

Signed and sealed this 1st day of October 1963.

(SEAL)
Attest:

ERNEST W. SWIDER                                          DAVID L. LADD
Attesting Officer                                              Commissioner of Patents